United States Patent
Okita (10) Patent No.: US 10,042,712 B2
(45) Date of Patent: Aug. 7, 2018

(54) NUMERICAL CONTROLLER

(71) Applicant: FANUC CORPORATION, Minamitsuru-gun, Yamanashi (JP)

(72) Inventor: Hiroshi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 95 days.

(21) Appl. No.: 15/230,884

(22) Filed: Aug. 8, 2016

(65) Prior Publication Data

US 2017/0052850 A1    Feb. 23, 2017

(30) Foreign Application Priority Data

Aug. 21, 2015    (JP) .................................. 2015-163782

(51) Int. Cl.
*G06F 11/14* (2006.01)
*G06F 3/06* (2006.01)

(52) U.S. Cl.
CPC .......... *G06F 11/1451* (2013.01); *G06F 3/065* (2013.01); *G06F 3/0619* (2013.01); *G06F 3/0685* (2013.01); *G06F 11/1469* (2013.01); *G06F 2201/805* (2013.01); *G06F 2201/84* (2013.01)

(58) Field of Classification Search
CPC ............. G06F 11/1438; G06F 11/1068; G06F 11/2094; G06F 11/2069; G06F 11/0766; G11C 29/04; G11C 29/52; G11C 29/12
See application file for complete search history.

(56) References Cited

U.S. PATENT DOCUMENTS

| 9,779,016 | B1* | 10/2017 | Shen | G06F 11/1456 |
| 2007/0283193 | A1* | 12/2007 | Lewis | G06F 11/1064 714/48 |
| 2010/0131696 | A1* | 5/2010 | Pratt | G06F 11/1451 711/103 |
| 2010/0299565 | A1* | 11/2010 | Muro | G06F 11/1004 714/54 |
| 2011/0276859 | A1* | 11/2011 | Baba | G06F 11/1092 714/770 |
| 2015/0261205 | A1 | 9/2015 | Okita | |

FOREIGN PATENT DOCUMENTS

| JP | 08185274 A | 7/1996 |
| JP | 08263389 A | 10/1996 |
| JP | 09044417 A | 2/1997 |

(Continued)

OTHER PUBLICATIONS

Notification of Reasons for Refusal for Japanese Application No. 2015-163782, dated Sep. 19, 2017, including English translation, 6 pages.

*Primary Examiner* — Nadeem Iqbal
(74) *Attorney, Agent, or Firm* — RatnerPrestia (57) ABSTRACT

If a numerical controller detects abnormality of data when data stored in a volatile memory is read out in backup of the data stored in the volatile memory to an external memory, the numerical controller compares an address of an abnormal data, which is detected, with an address stored in a non-volatile memory. When it is determined that the abnormal data which is detected is data of an invalid area, the numerical controller continues the backup processing.

2 Claims, 10 Drawing Sheets

(56) References Cited

FOREIGN PATENT DOCUMENTS

| | | | |
|---|---|---|---|
| JP | 09319667 | A | 12/1997 |
| JP | 11039231 | A | 2/1999 |
| JP | 2000163322 | A | 6/2000 |
| JP | 2006260128 | A | 9/2006 |
| JP | 2006268266 | A | 10/2006 |
| JP | 2007293856 | A | 11/2007 |
| JP | 2011237934 | A | 11/2011 |
| JP | 5398551 | B | 11/2013 |
| JP | 2015172816 | A | 10/2015 |
| WO | 2015040694 | A1 | 3/2015 |

* cited by examiner

FIG. 2

| MEMORY AREAS, IN WHICH VALID DATA ARE STORED, OF VOLATILE MEMORY |
|---|
| 0000H~00FFH |
| 0100H~01FFH |
| 0200H~02FFH |
| 0500H~05FFH |
| 0600H~06FFH |
| 0700H~07FFH |

NUMERICAL CONTROLLER

BACKGROUND OF THE INVENTION

1. Field of the Invention

The present invention relates to a numerical controller, and especially relates to a numerical controller which is capable of performing batch backup of memory areas even in the case where abnormality occurs in an unused memory area.

2. Description of the Related Art

Figure 7:
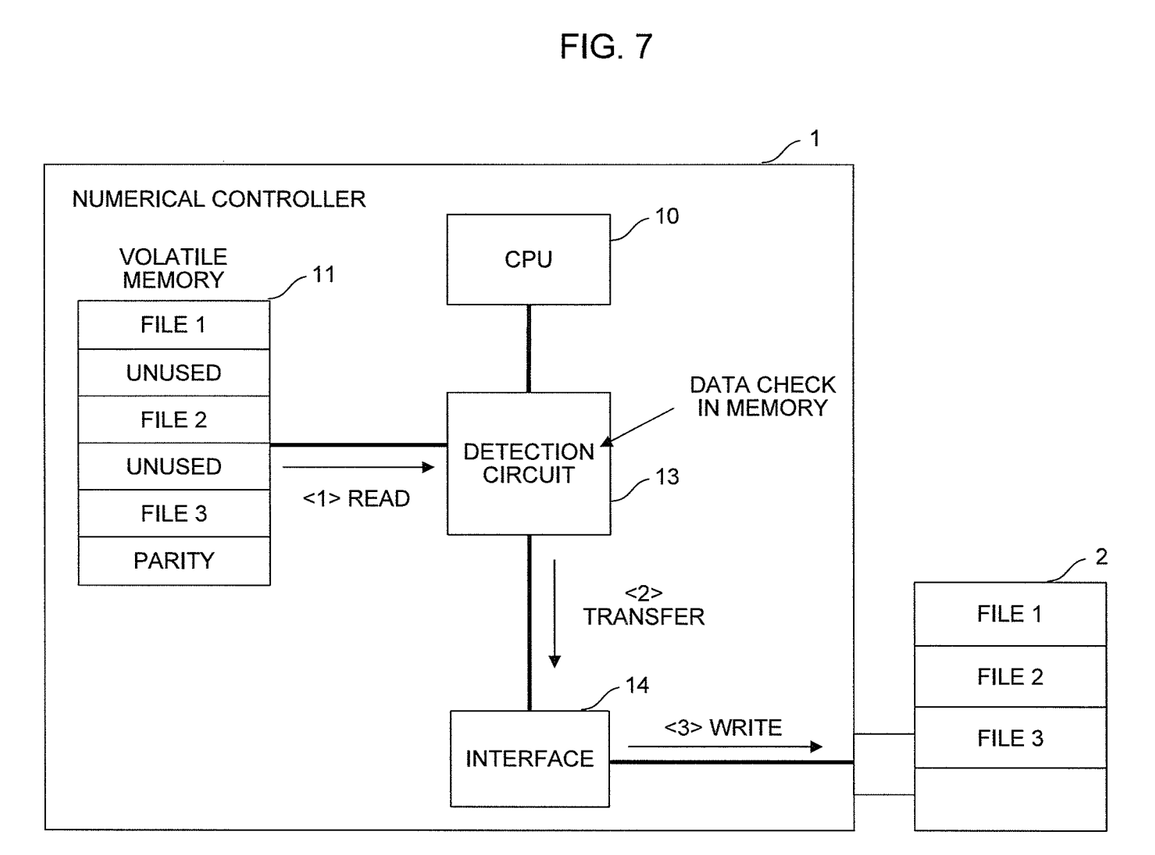
FIG. 7 is a schematic configuration diagram illustrating a numerical controller according to a prior art technique.

An example of a numerical controller according to a prior art technique will be described with reference to FIG. 7.

In a numerical controller 1, a memory which stores setting information for controlling a machine, a machining program of a user, tool management information, and the like is incorporated. Rewriting is frequently performed with respect to these data which are stored in the memory, so that these data are stored in a volatile memory 11 such as an SRAM to be used in many cases. However, data in the volatile memory 11 will be lost unless power is kept to be supplied, so that a data retention battery or the like is connected so as to retain the data. Further, these data are often backed up in an external memory 2 such as a compact flash (registered trademark), a USB memory, and an SD card via an interface 14 in case the data stored in the volatile memory 11 are broken (refer to Japanese Patent No. 5398551 (JP 5398551, B), for example).

As for the backup, there is a method in which data such as a machining program and tool management information are backed up respectively in the form of files. However, when the number of files becomes large, the backup operation and management of backed-up files become burdensome. Therefore, a method in which all memory areas are collectively backed up is employed.

Figure 8:
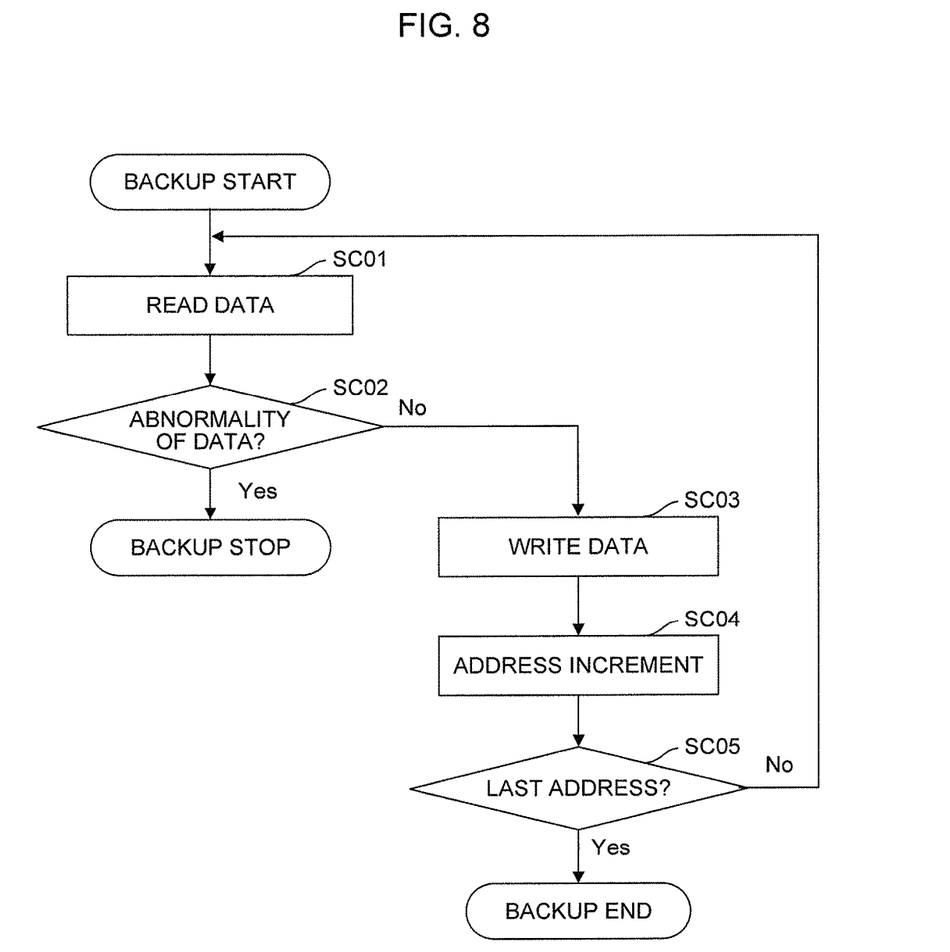
FIG. 8 is a flowchart illustrating a flow of processing for collectively backing up data stored in memory areas by the numerical controller of FIG. 7.

FIG. 8 is a flowchart illustrating a flow of processing for collectively backing up data stored in memory areas by the numerical controller 1.

In batch backup processing for memory areas, data are sequentially read out from the volatile memory 11 (step SC01) under the control of a central processing unit (CPU) 10, and when there is no abnormality in data which is read out (step SC02), the data which is read out is written in an external memory (step SC03). Then, when the reading and the writing of data of the whole memory area are completed (steps SC04 and SC05), this backup processing is ended.

Figure 9:
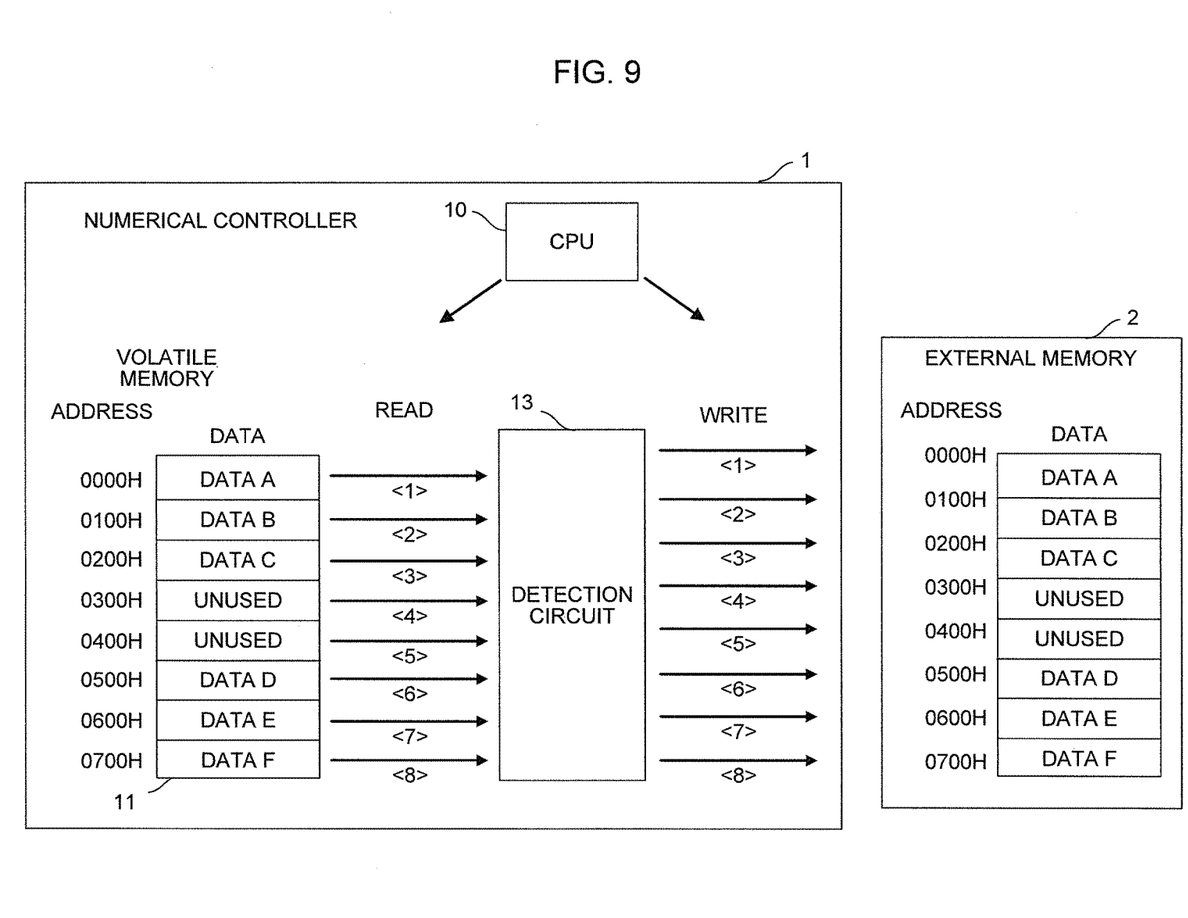
FIG. 9 illustrates a general outline of memory backup processing performed by the numerical controller of FIG. 7.

FIG. 9 illustrates a general outline of memory backup processing performed by the numerical controller 1.

In the method for collectively backing up memory areas of the volatile memory 11, the CPU 10 reads out data from a head address of the memory area in a sequential order and writes the data in an external memory 2 for backup through error check performed by a detection circuit 13. Files formed in the external memory 2 are unified in every backup, so that an operation in the backup and management of backed-up data are easily performed compared to backup for each file of data stored in a memory.

On the other hand, these data are important for a correct operation of the numerical controller 1. If abnormality is found in these data, it is necessary to immediately stop processing and issue an alarm representing the abnormality so that the numerical controller 1 does not operate in an abnormal manner. Examples of a cause of an occurrence of data abnormality include a case where data held in the memory is broken due to voltage drop of the above-mentioned data retention battery, a noise, a software error, and the like, a case where transfer data becomes abnormal when a bus is influenced by a noise, a software error, and the like in transfer, and the like.

A memory and a bus have a function for detecting data abnormality such as parity and ECC so as to detect abnormality of data and data check is performed in reading of data from the memory or in transfer of data (to the bus). If abnormality is recognized, an alarm is issued and processing is stopped.

The above-mentioned function for detecting abnormality of data is operated in backup and when abnormality of data is detected, an alarm is issued and processing is stopped.

The method for collectively backing up a memory facilitates an operation and management of backup data because files can be unified. However, all areas of the memory are backed up in this method, so that an invalid area which is not used in a normal operation is also included in an object of the backup. However, the above-mentioned function for detecting abnormality of data is always executed in reading of data. Therefore, abnormality is detected also in the case where there is abnormality of data in the above-mentioned invalid area, and processing is stopped. That is, when data in an area irrelevant to an actual operation is broken, backup for valid data is not completed in a normal manner.

Figure 10:
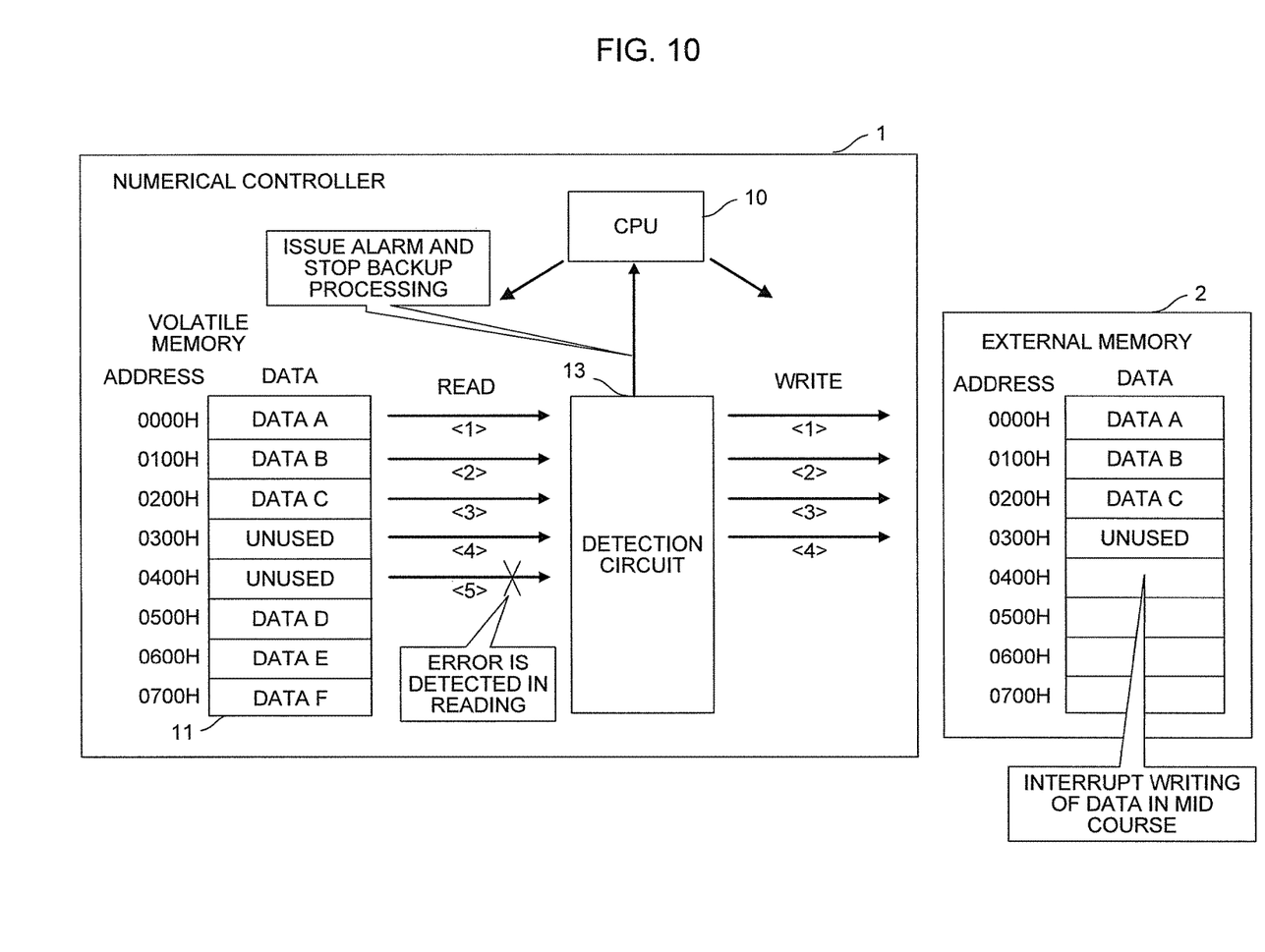
FIG. 10 illustrates a problem in the memory backup processing performed by the numerical controller of FIG. 7.

FIG. 10 illustrates memory backup processing in the case where abnormality is detected.

In batch backup of memory areas, when the detection circuit 13 detects abnormality of data which is read out in reading of the data stored in a memory area starting from address 0400H, for example, the CPU 10 issues an alarm based on a detection result of the detection circuit 13 and interrupts the memory backup processing even in the case where the memory area is not used in the numerical controller 1. Therefore, only data from the address 0000H to the address 03FFH are written in the external memory 2 and thus, such problem occurs that normal backup is not performed due to an unused memory area.

SUMMARY OF THE INVENTION

Therefore, an object of the present invention is to provide a numerical controller which is capable of performing batch backup of memory areas even in the case where abnormality occurs in an unused memory area.

In the present invention, in order to solve the above-mentioned problem, addresses of areas in which valid data are stored, in a volatile memory which is a backup object, are preliminarily stored in a non-volatile memory so as to recognize invalid areas in the volatile memory and abnormality of data which is detected in backup of an invalid area is ignored to continue backup of data.

A numerical controller according to a first aspect of the present invention is configured to back up data stored in a volatile memory to an external memory via an interface, and includes: a non-volatile memory which stores an address of a valid data areas in the volatile memory; a detection circuit which detects abnormality of data when data stored in the volatile memory is read out; and a backup processing continuance unit which compares, when the detection circuit detected abnormal data, an address of the abnormal data with an address stored in the non-volatile memory so as to determine whether the abnormal data is data in a valid data area or data in an invalid data area, and continues backup processing if the detected abnormal data is data in an invalid data area.

A numerical controller according to a second aspect of the present invention is configured to back up data stored in a volatile memory to an external memory via an interface, and includes: a non-volatile memory which stores an address of a valid data areas in the volatile memory; a detection circuit which detects abnormality of data when data stored in the volatile memory is read out; and a backup unit which performs backup processing only with respect to a valid data area in the volatile memory when data of the volatile memory is collectively backed up.

According to the present invention, abnormality of data in an invalid data area which is not used in a normal operation is ignored in backup of data of a volatile memory which is a backup object and accordingly, probability of stop of backup processing can be lowered.

BRIEF DESCRIPTION OF THE DRAWINGS

The above-described and other objects and features of the present invention will be apparent from the following description of embodiments in reference to the accompanying drawings. Among these drawings.

DETAILED DESCRIPTION OF THE PREFERRED EMBODIMENTS

Embodiments of the present invention will be described below with reference to the accompanying drawings. Here, it should be noted that the configurations identical or similar to those of the prior art technique are described by using the same reference numerals.

A numerical controller according to a first embodiment of the present invention is described with reference to FIGS. 1 to 4.

Figure 1:
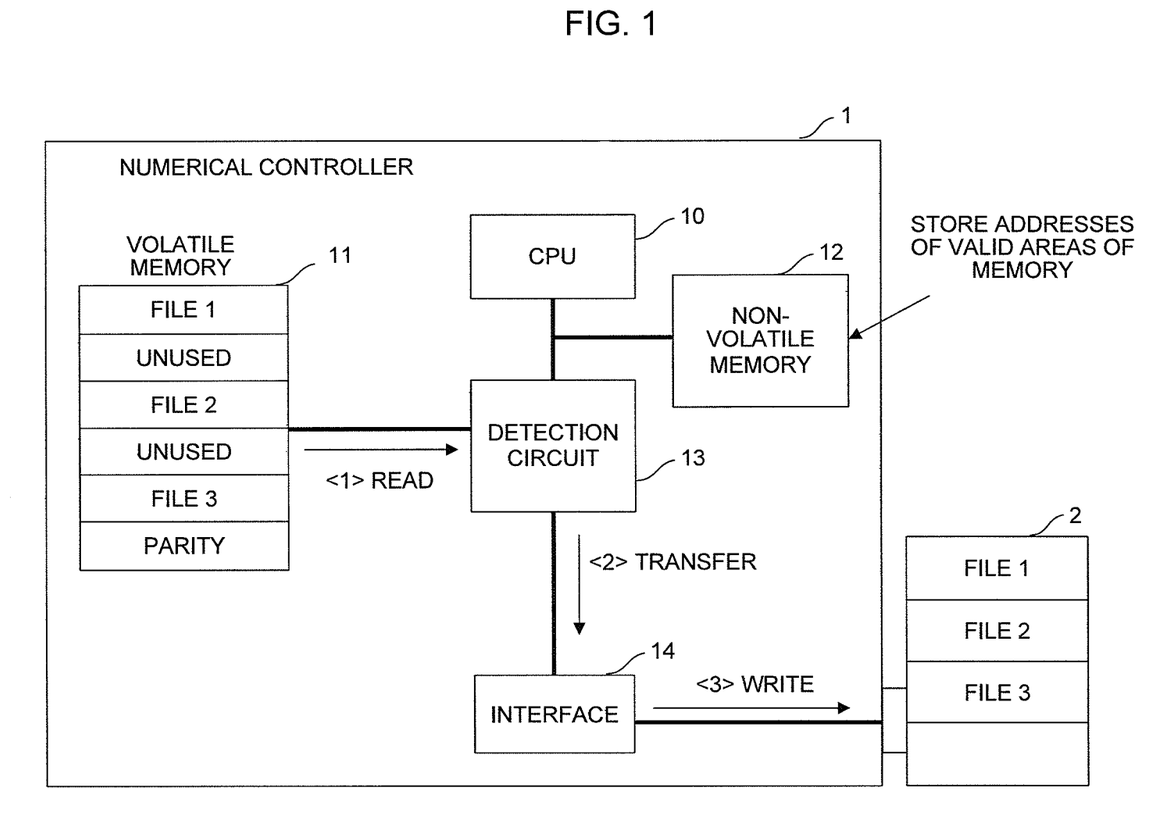
FIG. 1 is a schematic configuration diagram illustrating a numerical controller according to a first embodiment of the present invention.

FIG. 1 is a schematic configuration diagram illustrating the numerical controller according to the first embodiment of the present invention.

The numerical controller 1 includes the CPU 10, the volatile memory 11, a non-volatile memory 12, the detection circuit 13, and the interface 14. The numerical controller 1 can be connected with the external memory 2 via the interface 14.

The CPU 10 reads out a system program which is stored in a ROM (not illustrated) or the like so as to control the whole of the numerical controller 1 in accordance with the system program and execute later-described memory backup processing in accordance with a memory backup program included in the system program.

The volatile memory 11 is backed up by a battery (not illustrated) and is composed of an SRAM or the like. In the volatile memory 11, setting information for controlling a machine, a machining program of a user, tool management information, and the like are stored. On this volatile memory 11, a file system is built up, so that data stored in the volatile memory 11 can be accessed file by file from each program and data stored in memory areas of the volatile memory 11 can also be accessed address by address. Here, the volatile memory 11 has the ECC function, the parity function, or the like so as to be able to detect abnormality of each stored data.

The non-volatile memory 12 is composed of an EEPROM, a flash memory, an MRAM, a ReRAM, a FeRAM, or the like and stores and manages valid data area information related to used/unused memory areas of the volatile memory 11.

Figure 2:
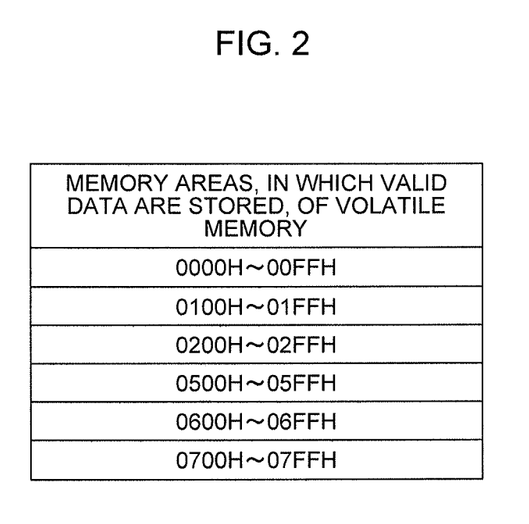
FIG. 2 illustrates an example of valid data area information.

FIG. 2 illustrates an example of the valid data area information.

The valid data area information is defined by a set of addresses or address ranges of memory areas, in which valid data are stored, among memory areas on the volatile memory 11, for example. The valid data area information is set to be unused (empty set) with respect to all memory areas of the volatile memory 11 at an initial introduction stage of the numerical controller 1. Then, when writing of data is performed to the volatile memory 11 by using a processing routine for controlling access to the volatile memory 11 in the system program and DMA transfer, for example, an address or an address range corresponding to a memory area to which the writing is performed is added to the valid data area information and an address or an address range corresponding to a memory area from which data is erased or released is deleted from the valid data area information.

The detection circuit 13 detects whether or not there is an occurrence of abnormality in data which is read by using the parity or the ECC, for example, when the data is read from the volatile memory 11. When abnormality of data is detected by the detection circuit 13, an alarm representing the detection of the abnormality is issued to be outputted to the CPU 10.

Further, the external memory 2 is composed of a non-volatile memory, such as a compact flash (registered trademark), a USB memory, and an SD card, which is connected with the numerical controller 1 via the interface 14. In the present embodiment, the external memory 2 is used for backup of data stored in the volatile memory 11.

Figure 3:
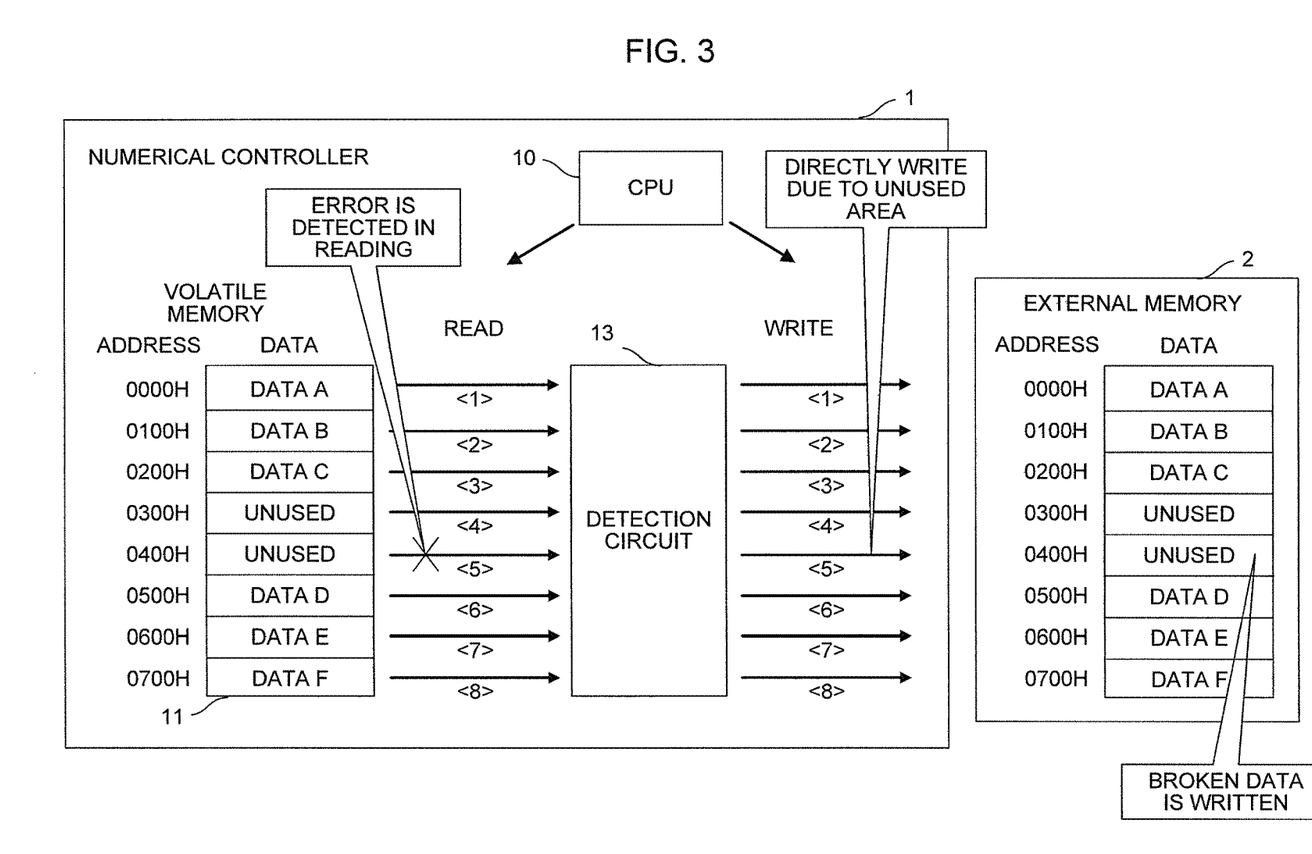
FIG. 3 illustrates batch backup processing, which is performed by the numerical controller (according to the first embodiment) of FIG. 1, for data which are stored in a volatile memory.

Batch backup processing for data stored in the volatile memory 11, which is performed by the numerical controller 1 having such configuration, is described with reference to FIG. 3.

When a batch backup function is selected, the CPU 10 executes the batch backup processing in accordance with a batch backup program included in the system program. When the batch backup processing is started, the CPU 10 accesses the external memory 2 via the interface 14 so as to form a backup file. Further, the CPU 10 reads out the valid data area information stored in the non-volatile memory 12 and stores the valid data area information in a temporary data storage memory (not illustrated).

In the batch backup processing, the CPU 10 reads out data in a sequential order from the address 0000H in the volatile memory 11. Then, the detection circuit 13 checks whether or not there is an occurrence of abnormality. When there is no occurrence of abnormality, the data which is read out is transferred to the interface 14 via the bus and the transferred data is written in a backup file on the external memory 2 from the interface 14.

In the present embodiment, in the case where abnormality of data is detected by the detection circuit 13 in reading of data, the CPU 10 refers to the valid data area information so as to determine whether a memory area storing the data whose abnormality is detected is valid (used) or invalid (unused). In the case where the memory area storing the data whose abnormality is detected is valid as a result, the CPU 10 issues an alarm and stops the batch backup processing. On the other hand, when the memory area storing the data whose abnormality is detected is invalid, the batch backup processing is continued and the data whose abnormality is detected is written in the backup file.

Then, the batch backup processing is continued up to the last address of the volatile memory 11 unless abnormality is detected in data in a valid memory area of the volatile memory 11. Subsequently, the valid data area information stored in the non-volatile memory 12 is added to the backup file to complete the backup.

Figure 4:
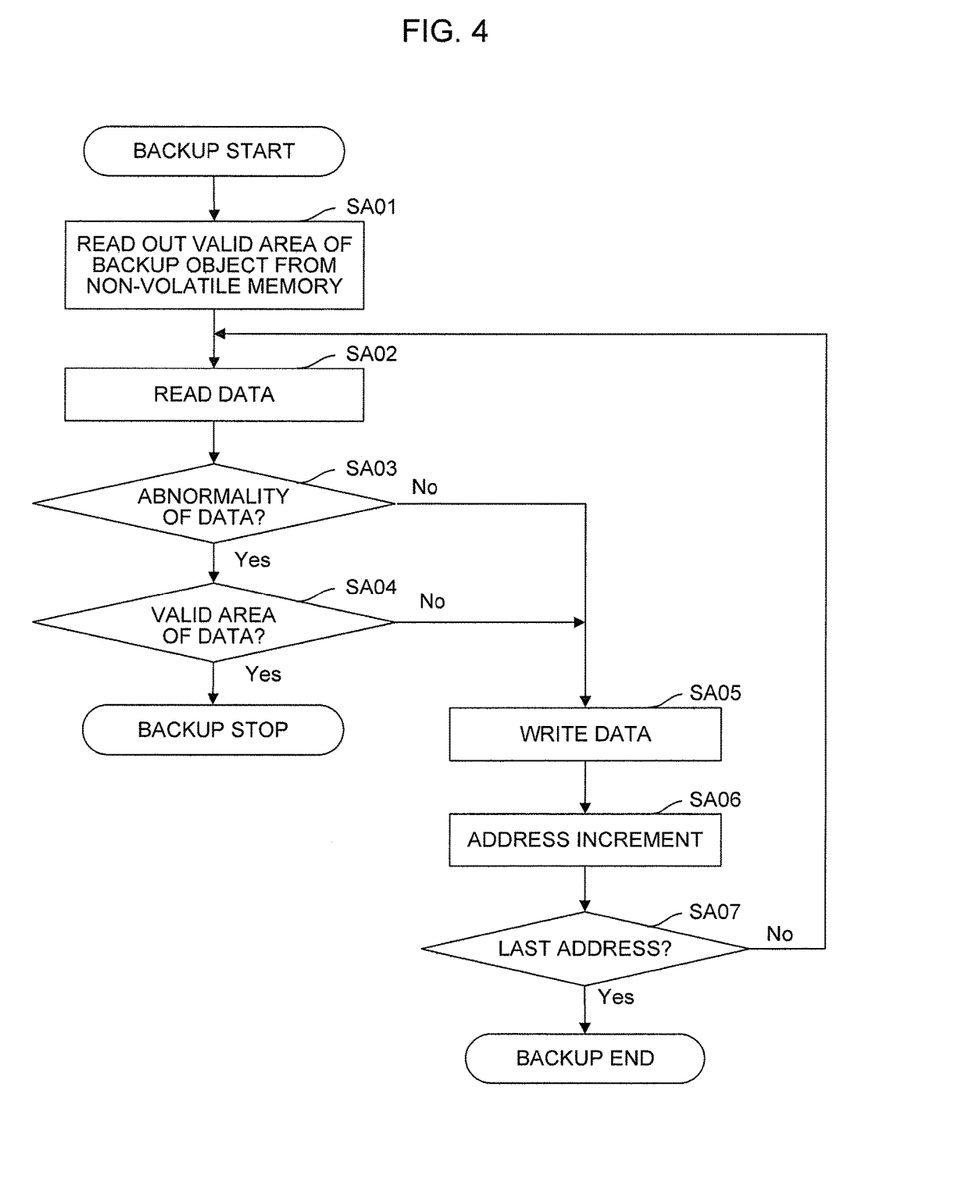
FIG. 4 is a flowchart illustrating a flow of the batch backup processing executed on the numerical controller of FIG. 1.

FIG. 4 is a flowchart illustrating a flow of the batch backup processing executed on the numerical controller 1 according to the present embodiment. The processing is explained below according to respective steps.

[Step SA01] When the batch backup processing is started, the CPU 10 reads out the valid data area information stored in the non-volatile memory 12 and stores the valid data area information, which is read out, in a temporary data storage memory (not illustrated).

[Step SA02] Data is read out from a memory area corresponding to the read address (initial value 0000H) of the volatile memory 11.

[Step SA03] The CPU 10 determines whether or not abnormality of data is detected by the detection circuit 13 in transfer of the data which is read out in step SA02. When abnormality of data is detected, the processing proceeds to step SA04. When abnormality of data is not detected, the processing proceeds to step SA05.

[Step SA04] The CPU 10 refers to the valid data area information which is read out in step SA01 so as to determine whether the memory area, in which the data whose abnormality is detected is stored, of the volatile memory 11 is valid or invalid. When the memory area is valid, the backup processing is stopped. When the memory area is invalid, the processing proceeds to step SA05.

[Step SA05] The data which is read out in step SA02 is written in the backup file on the external memory 2.

[Step SA06] The read address of the volatile memory 11 is incremented.

[Step SA07] The CPU 10 determines whether or not data stored in the volatile memory 11 are read out up to the last address. When data are read out up to the last address, this backup processing is ended. When data are not read out up to the last address, the processing returns to step SA02.

Thus, the numerical controller 1 according to the present embodiment ignores abnormality which is detected in data stored in an invalid memory area of the volatile memory 11, so that probability of stop of the backup processing can be lowered.

Figure 5:
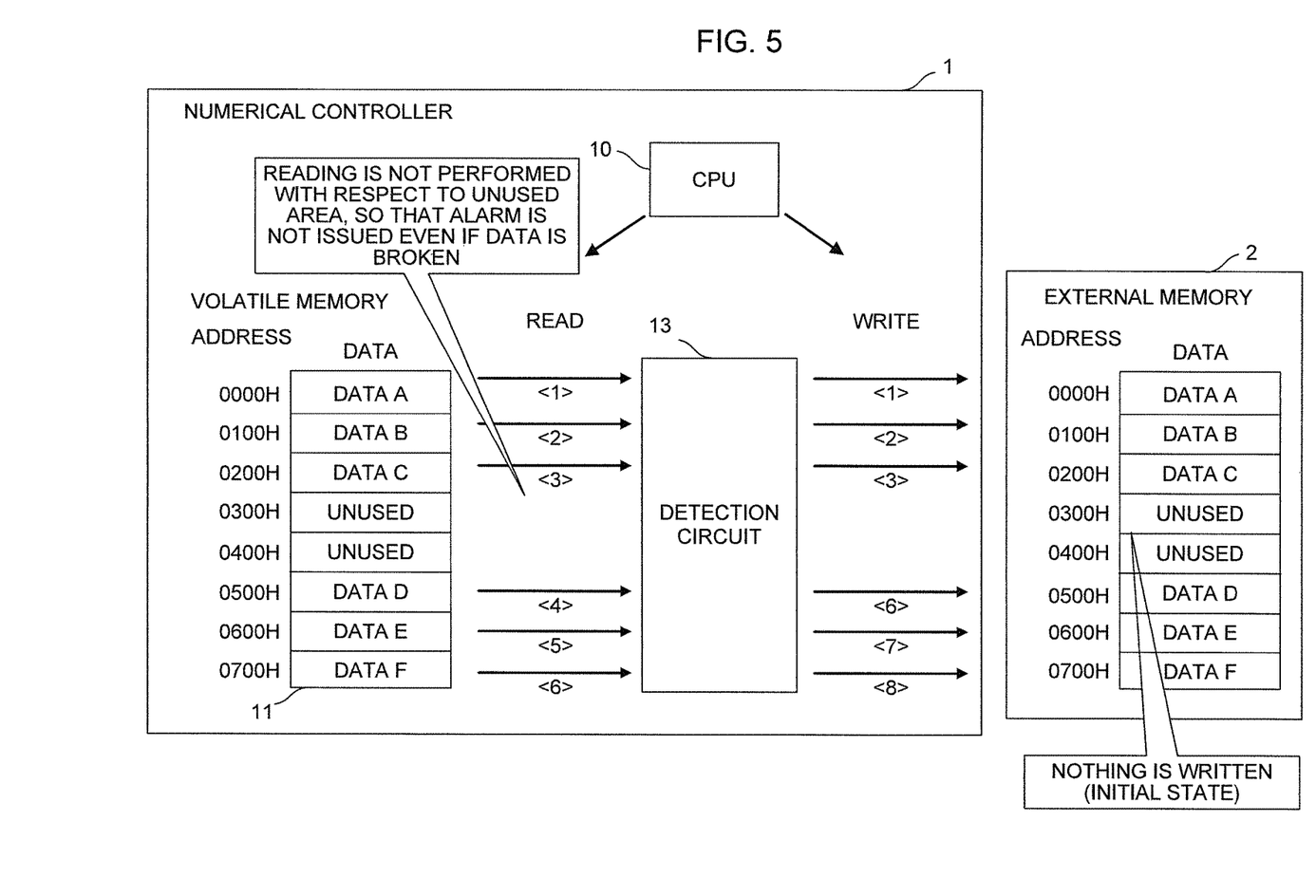
FIG. 5 illustrates batch backup processing, which is performed by a numerical controller (according to a second embodiment) of FIG. 1, for data which are stored in a volatile memory.

A numerical controller according to a second embodiment of the present invention will be described with reference to FIGS. 5 and 6.

In the above-described first embodiment, in the case where abnormality is detected in data, which is read from the volatile memory 11, in the batch backup processing and a memory area storing the data is an invalid memory area, the detection of the abnormality is ignored and the batch backup processing is continued.

On the other hand, in the present embodiment, an invalid memory area (unused memory area) is not accessed in batch backup processing.

The batch backup processing for data, which is stored in the volatile memory 11, according to the present embodiment is described with reference to FIG. 5. Here, it should be noted that the configuration of the numerical controller 1 of the present embodiment is same as the configuration of the numerical controller 1 of the first embodiment.

When the batch backup function is selected, the CPU 10 executes the batch backup processing in accordance with the batch backup program included in the system program. When the batch backup processing is started, the CPU 10 accesses the external memory 2 via an interface (not illustrated) so as to form a backup file. Further, the CPU 10 reads out the valid data area information stored in the non-volatile memory 12 and stores the valid data area information in a temporary data storage memory (not illustrated).

In the batch backup processing, the CPU 10 reads out data in a sequential order from the address 0000H in the volatile memory 11. When the CPU 10 reads out data from the volatile memory 11, the CPU 10 refers to the valid data area information so as to determine whether a memory area storing data which is to be read out next is valid (used) or invalid (unused). Then, in the case where the memory area is invalid, the CPU 10 only updates (increments) the read address of the volatile memory 11 and the write address to the backup file without performing reading of data and writing to the backup file, and shifts the processing to reading of the following data.

In the case where data in a valid memory area is read out, the detection circuit 13 checks whether or not there is an occurrence of abnormality. When there is no occurrence of abnormality, the data is transferred to the interface 14 via the bus. Then, the transferred data is written in the backup file on the external memory 2 from the interface 14. Further, in the case where abnormality of data is detected by the detection circuit 13 in reading of data, the CPU 10 issues an alarm and stops the batch backup processing.

In the present embodiment, data in an invalid memory area is not read out from the volatile memory 11 and is not written in the backup file, so that the batch backup processing is continued up to the last address of the volatile memory 11 unless abnormality is detected in data in a valid memory area of the volatile memory 11. Subsequently, the valid data area information stored in the non-volatile memory 12 is added to the backup file to complete the backup.

Here, a part corresponding to an invalid memory area on a backup file which is formed is in an initial state of the forming of the backup file. However, even if data in this part is restored on the volatile memory 11 of the numerical controller 1 from the backup, a memory area corresponding to this part is not used and accordingly, any problems do not occur on an operation of the numerical controller 1.

Figure 6:
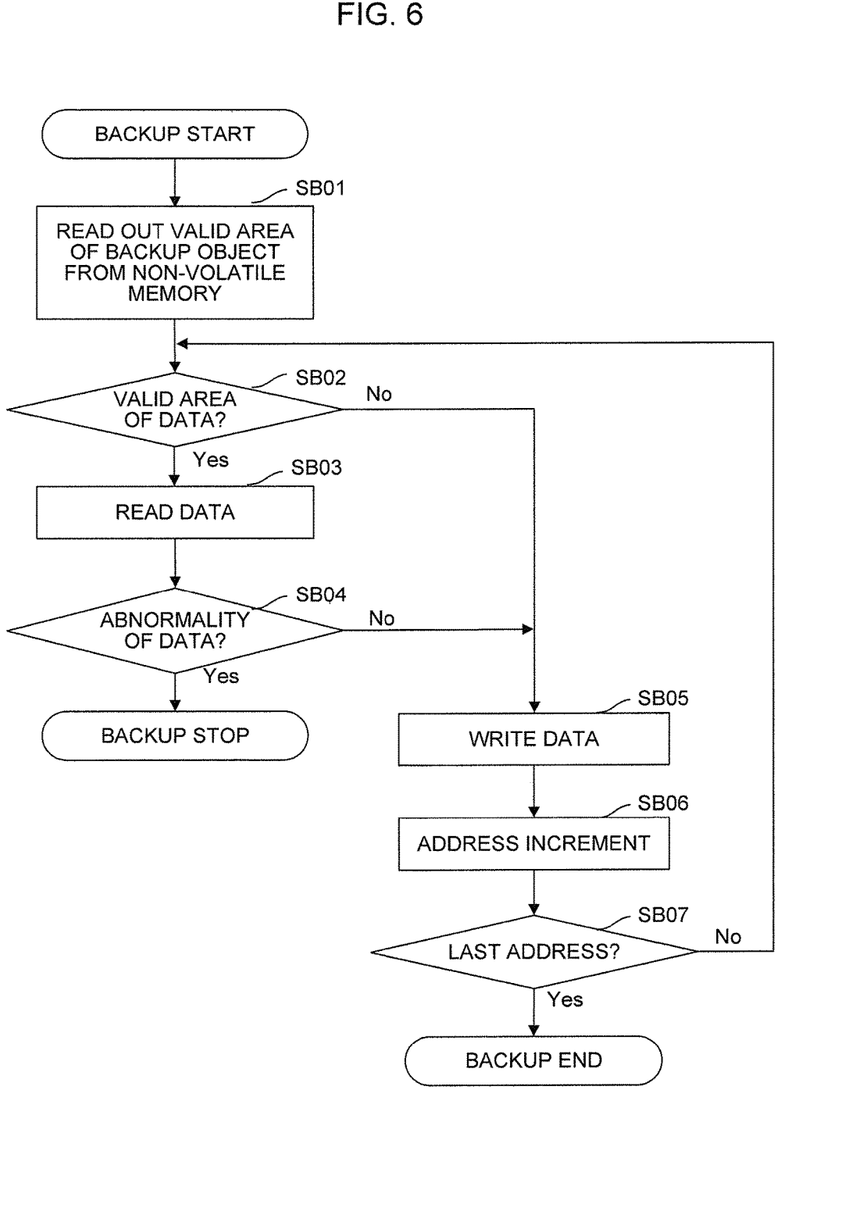
FIG. 6 is a flowchart illustrating a flow of the batch backup processing executed on the numerical controller (according to the second embodiment) of FIG. 1.

FIG. 6 is a flowchart illustrating a flow of the batch backup processing executed on the numerical controller 1 according to the present embodiment. The processing is explained below according to respective steps.

[Step SB01] When the batch backup processing is started, the CPU 10 reads out the valid data area information stored in the non-volatile memory 12 and stores the valid data area information in a temporary data storage memory (not illustrated).

[Step SB02] The CPU 10 refers to the valid data area information which is read out in step SB01 so as to determine whether a memory area represented by a read address (initial value 0000H) of the volatile memory 11 is valid or invalid. When the memory area is valid, the processing proceeds to step SB03. When the memory area is invalid, the processing proceeds to step SB06.

[Step SB03] Data is read out from a memory area corresponding to the read address of the volatile memory 11.

[Step SB04] The CPU 10 determines whether or not abnormality of the data is detected by the detection circuit 13 in transfer of the data which is read out in step SB03. When abnormality of data is detected, the backup processing is stopped. When abnormality of data is not detected, the processing proceeds to step SB05.

[Step SB05] The data which is read out in step SB03 is written in the backup file on the external memory 2.

[Step SB06] The read address of the volatile memory 11 is incremented.

[Step SB07] The CPU 10 determines whether or not data stored in the volatile memory 11 are read out up to the last address. When data are read out up to the last address, the backup processing is ended. When data are not read out up to the last address, the processing returns to step SB02.

Thus, the numerical controller 1 according to the present embodiment does not perform reading of data stored in an invalid memory of the volatile memory 11 and writing to a backup file, so that probability of stop of the backup processing can be lowered.

The embodiments of the present invention are described above. However, the present invention is not limited to the examples of the above-described embodiments and can be embodied in various aspects by adding arbitrary alterations.

The invention claimed is:

1. A numerical controller which is capable of backing up data stored in a volatile memory to an external memory via an interface, the numerical controller comprising:

a processor;
   a non-volatile memory, controlled by the processor to store an address of a valid data areas in the volatile memory;
   a detection circuit, controlled by the processor to detect abnormality of data when data stored in the volatile memory is read out; and
   a backup processing continuance unit, controlled by the processer to:
      compare an address of the abnormal data stored in the volatile memory with a valid data area address stored in the non-volatile memory, when the detection circuit detects abnormal data,
      stop backup processing if the comparison indicates that the address of the detected abnormal data matches the valid data area address, and
      continue backup processing if the comparison indicates that the address of the detected abnormal data does not match the valid data area address.

2. A numerical controller which is capable of backing up data stored in a volatile memory to an external memory via an interface, the numerical controller comprising:

a processor;
   a non-volatile memory, controlled by the processor to store an address of only valid data areas in the volatile memory;
   a detection circuit, controlled by the processor to detect abnormality of data when data stored in the valid data areas of the volatile memory is read out; and
   a backup unit configured to:
      compare an address of the abnormal data stored in the valid data areas of the volatile memory only with a valid data area address stored in the non-volatile memory when the detection circuit detects abnormal data,
      stop backup processing if the comparison indicates that the address of the detected abnormal data matches the valid data area address, and
      continue backup processing if the comparison indicates that the address of the detected abnormal data does not match the valid data area address.

* * * * *